United States Patent
Kamiyama

(10) Patent No.: US 10,011,148 B2
(45) Date of Patent: Jul. 3, 2018

(54) VEHICLE WHEEL

(71) Applicant: HONDA MOTOR CO., LTD., Minato-ku, Tokyo (JP)

(72) Inventor: Youichi Kamiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/125,480

(22) PCT Filed: Mar. 11, 2015

(86) PCT No.: PCT/JP2015/057083
§ 371 (c)(1),
(2) Date: Sep. 12, 2016

(87) PCT Pub. No.: WO2015/137370
PCT Pub. Date: Sep. 17, 2015

(65) Prior Publication Data
US 2017/0120673 A1    May 4, 2017

(30) Foreign Application Priority Data
Mar. 13, 2014   (JP) .................. 2014-050723

(51) Int. Cl.
| | |
|---|---|
| *B60C 19/00* | (2006.01) |
| *B60B 25/22* | (2006.01) |
| *B60B 21/12* | (2006.01) |
| *F01N 1/02* | (2006.01) |
| *B60B 21/02* | (2006.01) |
| *B60B 21/10* | (2006.01) |

(52) U.S. Cl.
CPC ............ *B60C 19/002* (2013.01); *B60B 21/12* (2013.01); *B60B 25/22* (2013.01); *F01N 1/023* (2013.01); *B60B 21/02* (2013.01); *B60B 21/10* (2013.01); *B60B 21/102* (2013.01); *B60B 21/108* (2013.01); *B60B 2900/133* (2013.01)

(58) Field of Classification Search
CPC ....... B60C 19/002; B60B 25/22; B60B 21/12; F01N 1/023
See application file for complete search history.

(56) References Cited

U.S. PATENT DOCUMENTS

| | | | |
|---|---|---|---|
| 6,309,026 B1 * | 10/2001 | Svedhem ................ | B60C 19/00 152/209.2 |
| 7,690,410 B2 | 4/2010 | Kamiyama et al. | |

(Continued)

FOREIGN PATENT DOCUMENTS

| | | |
|---|---|---|
| JP | 2010-095104 A | 4/2010 |
| JP | 2010-095147 A | 4/2010 |

(Continued)

*Primary Examiner* — Kip T Kotter
(74) *Attorney, Agent, or Firm* — Carrier Blackman & Associates, P.C.; Joseph P. Carrier; William D. Blackman

(57) ABSTRACT

A vehicle wheel (1) allows a communication hole (18a) for a first Helmholtz resonator (auxiliary air chamber members (10a, 10d)) having a lower resonance frequency than that of an air column resonance sound of a tire and a communication hole (18a) for a second Helmholtz resonator (auxiliary air chamber members (10b, 10c)) having a higher resonance frequency than that of the air column resonance sound of the tire to be disposed at positions facing each other across a wheel rotation center (Ax).

2 Claims, 8 Drawing Sheets

(56) References Cited

U.S. PATENT DOCUMENTS

| | | | | |
|---|---|---|---|---|
| 2002/0104600 A1* | 8/2002 | Flament | ................... | B60C 3/06 |
| | | | | 152/381.4 |
| 2004/0250935 A1* | 12/2004 | Morinaga | ................. | B60B 3/02 |
| | | | | 152/381.5 |
| 2008/0277997 A1* | 11/2008 | Kamiyama | ............. | B60B 3/044 |
| | | | | 301/95.101 |
| 2009/0072611 A1* | 3/2009 | Kashiwai | ............ | B60C 23/0408 |
| | | | | 301/5.21 |
| 2009/0108666 A1* | 4/2009 | Kashiwai | ................. | B60B 3/04 |
| | | | | 301/95.104 |
| 2010/0090520 A1* | 4/2010 | Kamiyama | ............... | B60B 1/08 |
| | | | | 301/95.104 |
| 2010/0096909 A1* | 4/2010 | Kamiyama | ............... | B60B 1/08 |
| | | | | 301/95.104 |
| 2011/0057505 A1* | 3/2011 | Nagata | ..................... | B60B 1/06 |
| | | | | 301/95.102 |

FOREIGN PATENT DOCUMENTS

| | | |
|---|---|---|
| JP | 4551422 B2 | 9/2010 |
| JP | 2012-051397 A | 3/2012 |

* cited by examiner

VEHICLE WHEEL

TECHNICAL FIELD

The present invention relates to a vehicle wheel.

BACKGROUND ART

Conventionally, there is known a wheel in which a Helmholtz resonator (auxiliary air chamber member) for deadening an air column resonance sound in a tire air chamber is attached to an outer circumferential surface of a well portion (for example, see Patent Literature 1). The Helmholtz resonator in this wheel has an auxiliary air chamber therein, and four Helmholtz resonators are disposed at regular intervals in a circumferential direction of the wheel. Moreover, a resonance frequency in each Helmholtz resonator is set to be a resonance frequency in the tire air chamber.

CITATION LIST

Patent Literature

Patent Literature 1: Japanese Patent No. 4551422

SUMMARY OF THE INVENTION

Technical Problem

However, when the resonance frequency in each Helmholtz resonator is set to be a single frequency, a frequency range for which sound deadening can be performed is limited.

Consequently, where a conventional wheel (e.g., see Patent Literature 1) is applied to a tire having a wide frequency range of an air column resonance sound in a tire air chamber, there occurs a problem that sound deadening performance is deteriorated.

In view of the above, an object of the present invention is to provide a vehicle wheel that provides good sound deadening performance even if applied to a tire having a wide frequency range of an air column resonance sound in a tire air chamber.

Solution to Problem

As means for solving the above problems, the present invention provides a vehicle wheel provided with Helmholtz resonators each having an auxiliary air chamber member communicated with a tire air chamber through a communication hole, the vehicle wheel including two groups of Helmholtz resonators, each group including: a first Helmholtz resonator that is set to have sound deadening characteristics for a sound having a lower resonance frequency than a resonance frequency of an air column resonance sound in the tire air chamber; and a second Helmholtz resonator that is set to have sound deadening characteristics for a sound having a higher resonance frequency than the resonance frequency of the air column resonance sound, wherein the communication hole for the first Helmholtz resonator and the communication hole for the second Helmholtz resonator are disposed at positions facing each other across a wheel rotation center, and a line that connects the communication hole for the first Helmholtz resonator with the communication hole for the second Helmholtz resonator in one group, and a line that connects the communication hole for the first Helmholtz resonator with the communication hole for the second Helmholtz resonator in another group, are perpendicular to each other.

Advantageous Effects of the Invention

The present invention makes it possible to provide a vehicle wheel that provides good sound deadening performance even if applied to a tire having a wide frequency range of an air column resonance sound in a tire air chamber.

DESCRIPTION OF EMBODIMENTS

Embodiments of the present invention will be hereinafter described in detail with reference to the drawings as appropriate.

Figure 1:
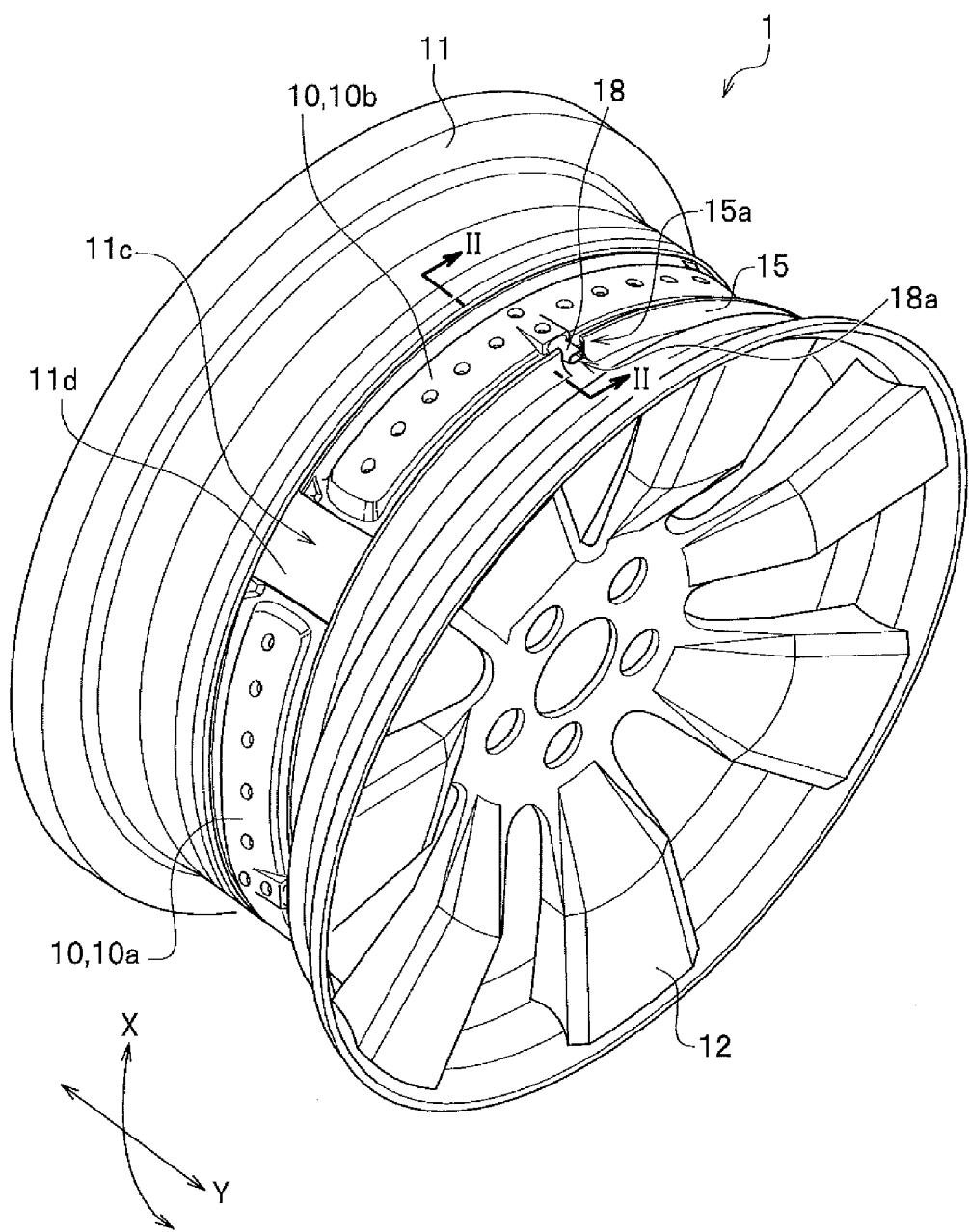
FIG. 1 is a perspective view of a vehicle wheel according to an embodiment of the present invention.

As shown in FIG. 1, a vehicle wheel 1 according to the present embodiment is provided with a plurality of auxiliary air chamber members 10 each serving as a Helmholtz resonator in a wheel circumferential direction X. Although in FIG. 1, only two auxiliary air chamber members 10a and 10b are shown for convenience of illustration, the vehicle wheel 1 is provided with four auxiliary air chamber members 10a, 10b, 10c and 10d (see FIG. 4) in the wheel circumferential direction X as described in detail later. Incidentally, the auxiliary air chamber member 10a and the auxiliary air chamber member 10d in this embodiment correspond to a "first Helmholtz resonator" set forth in the claims, and the auxiliary air chamber member 10b and the auxiliary air chamber member 10c correspond to a "second Helmholtz resonator" set forth in the claims.

The vehicle wheel 1 according to the present embodiment includes two groups of Helmholtz resonators, each group including a communication hole 18a for the first Helmholtz resonator having a lower resonance frequency than a resonance frequency of an air column resonance sound of a tire, and a communication hole 18a for the second Helmholtz resonator having a higher resonance frequency than the resonance frequency of the air column resonance sound of the tire. The vehicle wheel 1 according to the present embodiment is mainly characterized in that a line that connects the communication hole 18a for the first Helmholtz resonator with the communication hole 18a for the second Helmholtz resonator in one group, and a line that connects the communication hole 18a for the first Helmholtz resonator with the communication hole 18a for the second Helmholtz resonator in another group, are perpendicular to each other.

Note that the above auxiliary air chamber members 10a, 10b, 10c and 10d will be simply referred to as "the auxiliary air chamber member 10" where they are not discriminated from each other, in the description below.

As shown in FIG. 1, the vehicle wheel 1 according to the present embodiment includes a rim 11, and a disk 12 for connecting the rim 11 to a hub (not shown). In FIG. 1, reference sign 11d denotes an outer circumferential surface of a well portion 11c, and the auxiliary air chamber member 10 is fitted in the well portion 11c as described in detail later. Moreover, reference sign 18 denotes a tube member inside which the communication hole 18a is formed, and reference sign 15 denotes an annular vertical wall which is provided to erect on the outer circumferential surface 11d of the well portion 11c to extend in the circumferential direction of the rim 11. Incidentally, the auxiliary air chamber member 10 is fixedly engaged with the vertical wall 15 as described later. Reference sign 15a denotes a cut-out portion of the vertical wall 15 into which the tube member 18 is fitted when the auxiliary air chamber member 10 is fixedly engaged with the vertical wall 15. Reference sign Y denotes an arrow mark indicating a wheel width direction.

Figure 2:
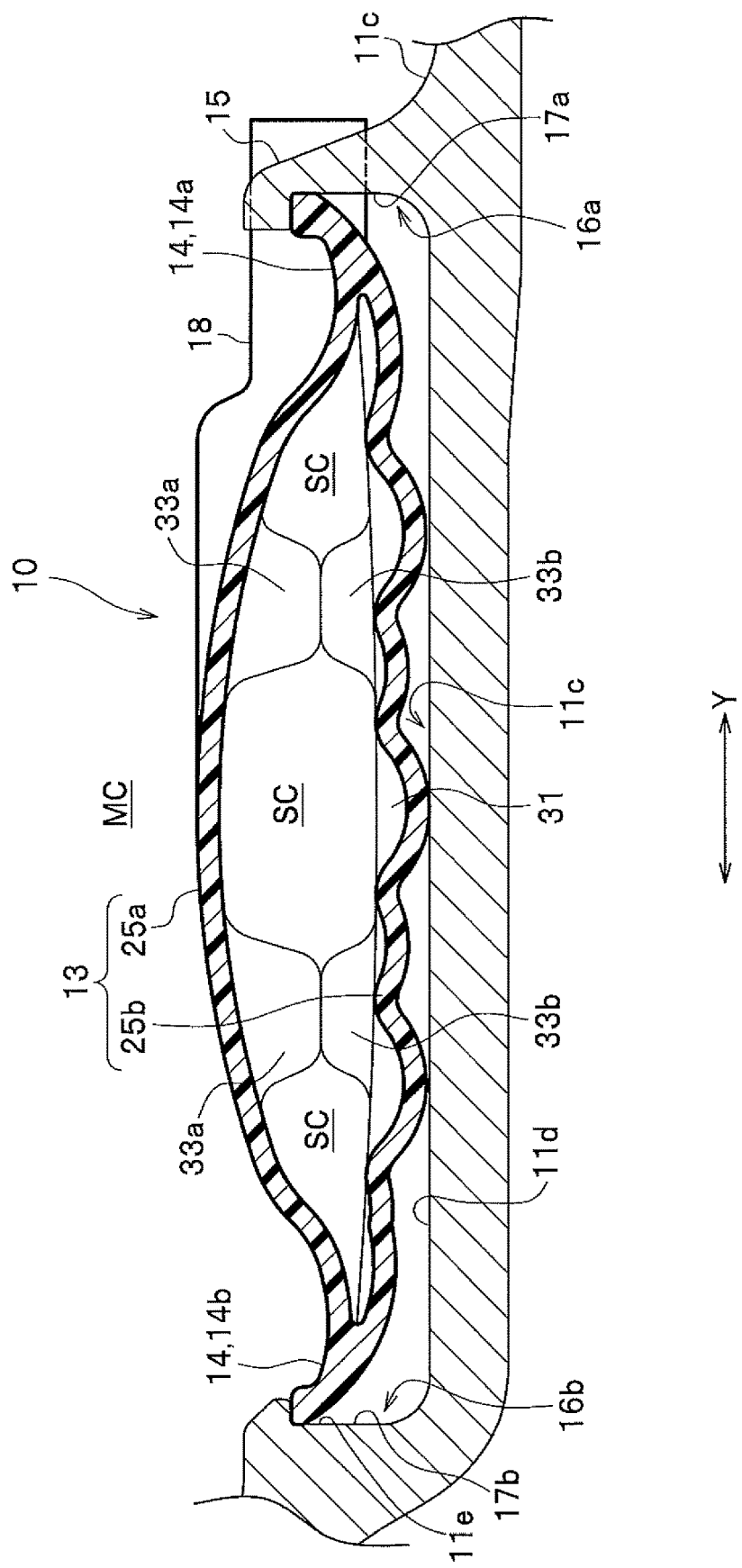
FIG. 2 is a cross-sectional view taken along the II-II line in FIG. 1.

FIG. 2 is a cross-sectional view taken along the II-II line in FIG. 1.

As shown in FIG. 2, the rim 11 includes the well portion 11c which is concave inward (toward a rotation center) in a wheel radial direction between bead seat portions (not shown) of the tire formed on both end portions of the rim 11 in the wheel width direction Y.

The well portion 11c is provided for fitting bead portions (not shown) of the tire therein when the tire not shown is mounted on the rim 11. Incidentally, the well portion 11c in the present embodiment is formed in the form of a cylinder which has nearly the same radius in the wheel width direction Y.

The annular vertical wall 15 is provided to erect on the outer circumferential surface 11d of the well portion 11c to extend in the circumferential direction of the rim 11.

The vertical wall 15 is provided to erect on the outer circumferential surface 11d to form a first vertical wall surface 16a which rises outward (upside in the illustration of FIG. 2, the same applies hereinafter) in the wheel radial direction from the outer circumferential surface 11d of the well portion 11c.

Moreover, a second vertical wall surface 16b is provided to face the first vertical wall surface 16a, on a side surface portion 11e which is formed on the inner side (left side in the illustration of FIG. 2) in the wheel width direction Y of the well portion 11c. Note that the vertical wall 15 in the present embodiment is shaped integral with the well portion 11c when the rim 11 is cast.

Moreover, the first vertical wall surface 16a and the second vertical wall surface 16b have a groove 17a and a groove 17b formed thereon, respectively. The grooves 17a, 17b are formed along the circumferential direction of the outer circumferential surface 11d of the well portion 11c to form an annular groove, respectively. The auxiliary air chamber member 10 has fringe portions 14a, 14b which are adapted to be fitted in the grooves 17a, 17b. Note that the grooves 17a, 17b in the present embodiment are formed by machining the vertical wall 15 and the side surface portion 11e, respectively.

Figure 3:
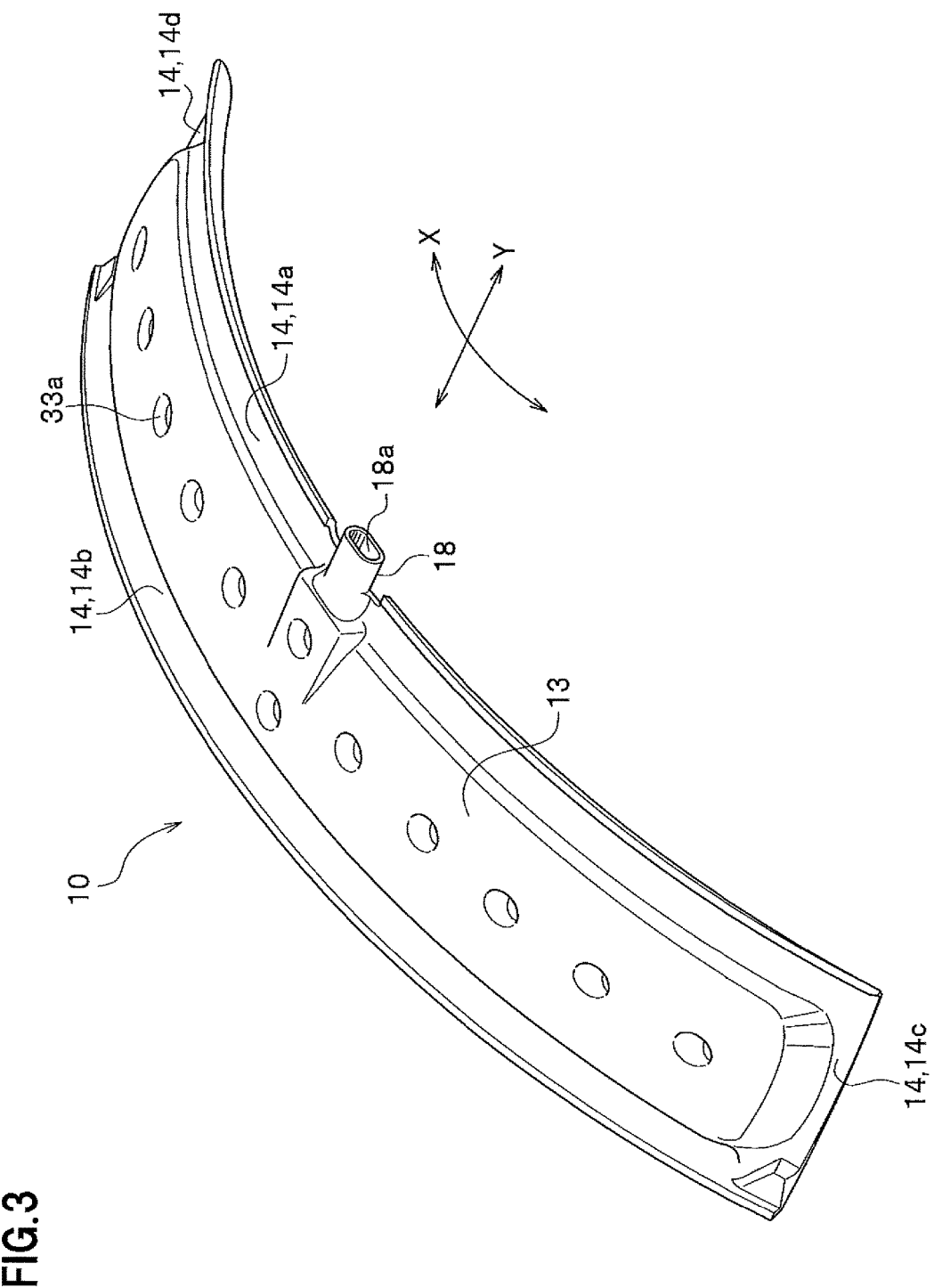
FIG. 3 is an overall perspective view of an auxiliary air chamber member.

FIG. 3 is an overall perspective view of the auxiliary air chamber member 10. In FIG. 3, reference sign X denotes an arrow mark indicating the wheel circumferential direction when the auxiliary air chamber member 10 is mounted on the well portion 11c. Reference sign Y denotes an arrow mark indicating the wheel width direction.

As described above, the vehicle wheel 1 in the present embodiment includes four auxiliary air chamber members 10a, 10b, 10c and 10d (see FIG. 4), and the auxiliary air chamber members 10a, 10d (first Helmholtz resonators) and the auxiliary air chamber members 10b, 10c (second Helmholtz resonators) have the same structure except that the resonance frequencies thereof are set to be different from each other. Accordingly, in the description below, considering each of the auxiliary air chamber members 10a, 10b, 10c and 10d as the auxiliary air chamber member 10, description will be given of the structure of the auxiliary air chamber members 10.

As shown in FIG. 3, the auxiliary air chamber member 10 is a member elongated in the wheel circumferential direction X and includes a main body 13, the tube member 18 having the communication hole 18a formed inside, and a fringe portion 14. The auxiliary air chamber member 10 is curved in its longitudinal direction (wheel circumferential direction X) to follow the outer circumferential surface 11d (see FIG. 1) of the well portion 11c (see FIG. 1).

Referring back to FIG. 2, the main body 13 of the auxiliary air chamber member 10 includes a lower plate 25b, and an upper plate 25a allowing the auxiliary air chamber SC to be formed between the lower plate 25b and the upper plate 25a. Note that each of the upper plate 25a and the lower plate 25b in the present embodiment has the same thickness, but these thicknesses may differ from each other.

The upper plate 25a is curved to have a bulge above the lower plate 25b which is disposed along the outer circumferential surface 11d of the well portion 11c, thereby forming the auxiliary air chamber SC.

The upper plate 25a includes upper side connecting portions 33a formed on portions constituting the main body 13. The upper side connecting portions 33a are formed to allow the upper plate 25a to be concave toward the auxiliary air chamber SC, and have a circular shape in planar view.

As shown in FIG. 3, ten upper side connecting portions 33a are formed along the longitudinal direction (wheel circumferential direction X) of the auxiliary air chamber member 10 to line up on the central line of the main body 13, and two upper side connecting portions 33a are formed at the position of the tube member 18 to line up in the short direction (wheel width direction Y) of the auxiliary air chamber member 10.

As shown in FIG. 2, the lower plate 25b includes lower side connecting portions 33b formed at positions corresponding to the upper side connecting portions 33a.

The lower side connecting portions 33b are formed to allow the lower plate 25b to be concave toward the auxiliary air chamber SC, and have a circular shape in planar view. The lower side connecting portions 33b allow leading ends thereof to be integral with leading ends of the upper side connecting portions 33a on the upper plate 25a to thereby connect the upper plate 25a with the lower plate 25b.

Note that in the present invention, a configuration such that the upper side connecting portions 33a and the lower side connecting portions 33b are not provided can also be adopted.

As shown in FIG. 3, the tube member 18 has the communication hole 18a therein. The tube member 18 is formed in the middle in the longitudinal direction (wheel circumferential direction X) of the auxiliary air chamber member 10.

The tube member 18 protrudes from the main body 13 in the wheel width direction Y.

The communication hole 18a allows the auxiliary air chamber SC (see FIG. 2) to be communicated with a tire air chamber MC (see FIG. 2) which is to be formed between the well portion 11c (see FIG. 2) and the tire not shown, and constitutes a Helmholtz resonator together with the auxiliary air chamber SC of the auxiliary air chamber member 10.

A cross-sectional shape of the communication hole 18a is of an ellipsoidal shape (see FIG. 3) in the present embodiment, but not particularly limited to this, may be any one of a circular shape and a polygonal shape.

Note that a distance between the communication holes 18a to be described in detail later is defined by a distance between each opening of the communication holes 18a.

The tube member 18 having the communication hole 18a thus configured in the present embodiment is fitted in the cut-out portion 15a (see FIG. 1) of the vertical wall 15, thereby also serving as a rotation stopper for the auxiliary air chamber member 10 in the wheel circumferential direction X (see FIG. 1).

As shown in FIG. 2, the fringe portion 14 connects the lower plate 25b with the upper plate 25a.

Moreover, as shown in FIG. 3, the fringe portion 14 is composed of a fringe portion 14c and a fringe portion 14d each extending from the main body 13 in the wheel circumferential direction X, and a fringe portion 14a and a fringe portion 14b each extending from the main body 13 in a direction (wheel width direction Y) perpendicular to the wheel circumferential direction X. More specifically, the fringe portion 14 (14a, 14b, 14c, 14d) is formed of a plate-like body which extends circumferentially from the main body 13 to surround the main body 13.

Moreover, as shown in FIG. 2, respective leading ends of the fringe portion 14a and the fringe portion 14b extending in the wheel width direction Y are fitted in the groove 17a on the first vertical wall surface 16a and the groove 17b on the second vertical wall surface 16b.

The fringe portion 14a and the fringe portion 14b extending toward the first vertical wall surface 16a and the second vertical wall surface 16b are integral with the curved lower plate 25b to form a curved surface, respectively, which is convex toward the outer circumferential surface 11d of the well portion 11c.

A thickness of the fringe portion 14 thus configured in the present embodiment is set to nearly the same thickness as a thickness of the lower plate 25b and the upper plate 25a. Moreover, the fringe portion 14 has elasticity such as a spring by selecting the thickness and/or material thereof as appropriate.

The auxiliary air chamber members 10 according to the present embodiment described above assumes a molded component made of resin, but not limited to this, may be formed of other materials such as metal. Note that, in the case of a resin component, in view of weight saving, improvement in mass productivity, reduction in production cost, securing of airtightness of the auxiliary air chamber SC, and the like, resin is preferably used which is light in weight, high in stiffness and able to be blow-molded. Of resin, polypropylene is particularly preferable which is also resistant to repetitive bending fatigue.

Next, description will be given of locations of the auxiliary air chamber members 10 (Helmholtz resonators) in the vehicle wheel 1 of the present embodiment.

Figure 4:
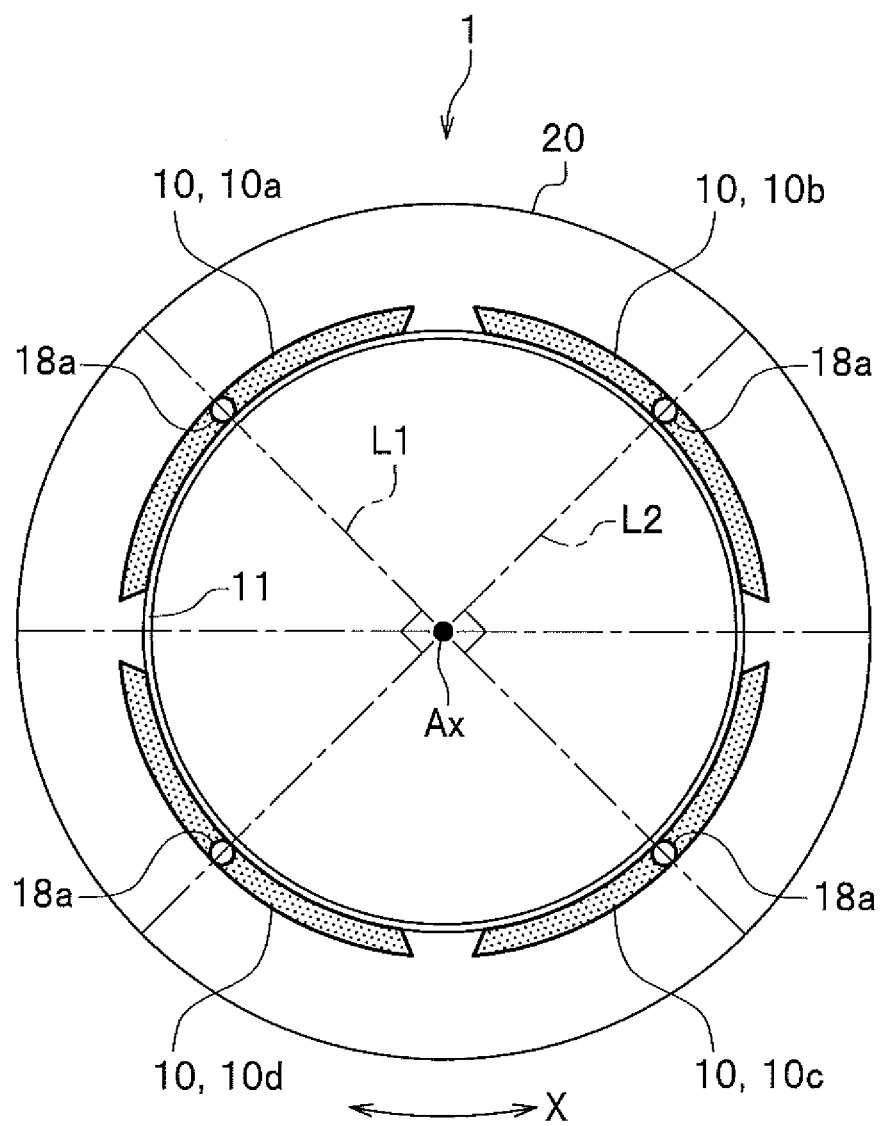
FIG. 4 is a side cross-sectional view schematically showing locations of a first Helmholtz resonator and a second Helmholtz resonator.

FIG. 4 is a side cross-sectional view schematically showing locations of the auxiliary air chamber members 10a, 10d each serving as the first Helmholtz resonator and the auxiliary air chamber members 10b, 10c each serving as the second Helmholtz resonator. FIG. 4 schematically shows a cross-section obtained by cutting the auxiliary air chamber members 10a, 10b, 10c and 10d along a curved surface following a curvature in the longitudinal direction thereof, and schematically shows positions of formation of the communication holes 18a.

The vehicle wheel 1 in the present embodiment allows a difference of predetermined range to be provided between a resonance frequency $f_0$ of the auxiliary air chamber members 10a, 10d (first Helmholtz resonators) and a resonance frequency $f_0$ of the auxiliary air chamber members 10b, 10c (second Helmholtz resonators).

More specifically, for the resonance frequency $f_{MC}$ of the air column resonance sound in the tire air chamber MC, the resonance frequency $f_0$ of the auxiliary air chamber members 10a, 10d (first Helmholtz resonators) is set to $f_{MC}-\alpha$ [Hz](where $\alpha$ is a positive number of 1 to 10), and the resonance frequency $f_0$ of the auxiliary air chamber members 10b, 10c (second Helmholtz resonators) is set to $f_{MC}+\alpha$ [Hz](where $\alpha$ is the same as the above).

That is, the resonance frequency $f_0$ of the auxiliary air chamber members 10a, 10d (first Helmholtz resonators) is set to be lower than the resonance frequency $f_{MC}$ of the air column resonance sound in the tire air chamber MC. Preferably, the difference a between the resonance frequency $f_0$ and the resonance frequency $f_{MC}$ ($\alpha=f_0-f_{MC}$) is set to be −1 to −10 [Hz]. More preferably, the difference a is set to be −5 to −8 [Hz].

Moreover, the resonance frequency $f_0$ of the auxiliary air chamber members 10b, 10c (second Helmholtz resonators) is set to be higher than the resonance frequency $f_{MC}$ of the air column resonance sound in the tire air chamber MC. Preferably, the difference a between the resonance frequency $f_0$ and the resonance frequency $f_{MC}$ ($\alpha=f_0-f_{MC}$) is set to be 1 to 10 [Hz]. More preferably, the difference a is set to be 5 to 8 [Hz].

Incidentally, setting of the resonance frequency $f_0$ of the auxiliary air chamber members 10 depending on the resonance frequency $f_{MC}$ of the air column resonance sound of the tire can be carried out by appropriately adjusting some elements selected from among a volume (V) of the auxiliary air chamber SC, a length (L) of the communication hole 18a, and a cross-sectional area (S) of the opening of the communication hole 18a, which are expressed in the following (Expression 1).

$$f_0 = C/2\pi \times \sqrt{(S/V(L+\alpha \times \sqrt{S}))} \quad \text{(Expression 1)}$$

$f_0$ (Hz): Resonance frequency
C (m/s): Sonic speed in auxiliary air chamber SC (=Sonic speed in tire air chamber MC)
V (m³): Volume of auxiliary air chamber SC
L (m): Length of communication hole 18a
S (m²): Cross-sectional area of opening of communication hole 18a
$\alpha$: Correction coefficient As shown in FIG. 4, the vehicle wheel 1 according to the present embodiment is configured so that the auxiliary air chamber member 10a (first Helmholtz resonator), the auxiliary air chamber member 10b (second Helmholtz resonator), the auxiliary air chamber member 10c (second Helmholtz resonator) and the auxiliary air chamber member 10d (first Helmholtz resonator) are located in this order in the wheel circumferential direction X.

Also, the respective communication holes 18a for the auxiliary air chamber member 10a and the auxiliary air chamber member 10c that constitute one group including the first Helmholtz resonator and the second Helmholtz resonator are disposed at positions facing each other across a wheel rotation center Ax.

Moreover, the respective communication holes 18a for the auxiliary air chamber member 10d and the auxiliary air chamber member 10b that constitute another group including the first Helmholtz resonator and the second Helmholtz resonator are disposed at positions facing each other across the wheel rotation center Ax.

Furthermore, the vehicle wheel 1 according to the present embodiment is configured so that a line L1 that connects the communication hole 18a for the auxiliary air chamber member 10a (first Helmholtz resonator) with the communication hole 18a for the auxiliary air chamber member 10c (second Helmholtz resonator), and a line L2 that connects the communication hole 18a for the auxiliary air chamber member 10d (first Helmholtz resonator) with the communication hole 18a for the auxiliary air chamber member 10b (second Helmholtz resonator), are perpendicular to each other. Note that in the present embodiment, the term "perpendicular" means that the line L1 and the line L2 intersect at an angle of 90 degrees within the range containing an error (deviation angle). This error (deviation angle) is preferably within a range of −10 degrees to +10 degrees.

The vehicle wheel 1 configured as above allows a frequency range for which sound deadening is performed, to be further widened as compared to the conventional vehicle wheel (e.g., see Patent Literature 1), as exemplified in a working example to be described later.

Accordingly, the vehicle wheel 1 makes it possible to provide good sound deadening performance even if applied to the tire having a wide frequency range of the air column resonance sound in the tire air chamber MC.

Although the present embodiment has been described above, the present invention is not limited to the above embodiment and can be put into practice in various forms.

Although the above embodiment assumes that the auxiliary air chamber members 10a, 10b, 10c and 10d employ four separate components, the present invention may also adopt a configuration in which some auxiliary air chamber members 10 selected from among the auxiliary air chamber members 10a, 10b, 10c and 10d are combined to be integrally formed.

Also, although the above embodiment allows the Helmholtz resonator to be constituted by the auxiliary air chamber member 10 which can be mounted on the well portion 11c, the present invention may also adopt a configuration in which the auxiliary air chamber SC and the communication hole 18a are directly built into the rim 11 by providing a hollow or the like within the rim 11.

Moreover, although in the above embodiment, description has been given of the case where the communication hole 18a of the auxiliary air chamber member 10 is provided in the middle in the longitudinal direction of the auxiliary air chamber member 10, the present invention is not limited to this embodiment. Accordingly, the present invention may adopt a configuration in which the communication hole 18a is formed at either end in the longitudinal direction of the auxiliary air chamber member 10 on the assumption that the line L1 and the line L2 described above are perpendicular to each other.

Furthermore, although in the above embodiment, description has been given of the case where each of the communication holes 18a of the auxiliary air chamber members 10a, 10b, 10c and 10d is disposed near the disk 12 in the wheel width direction Y, locations of the communication holes 18a are not limited to this embodiment. Accordingly, each of the communication holes 18a of the auxiliary air chamber members 10a, 10b, 10c and 10d can be disposed at any location in the wheel width direction Y. In this case, the line L1 and the line L2 described above need only be perpendicular to each other when viewed from the direction along the wheel rotation axis.

WORKING EXAMPLES

Next, the present invention will be described more concretely, with reference to a working example and comparative examples of the present invention.

Working Example

Figure 5A:
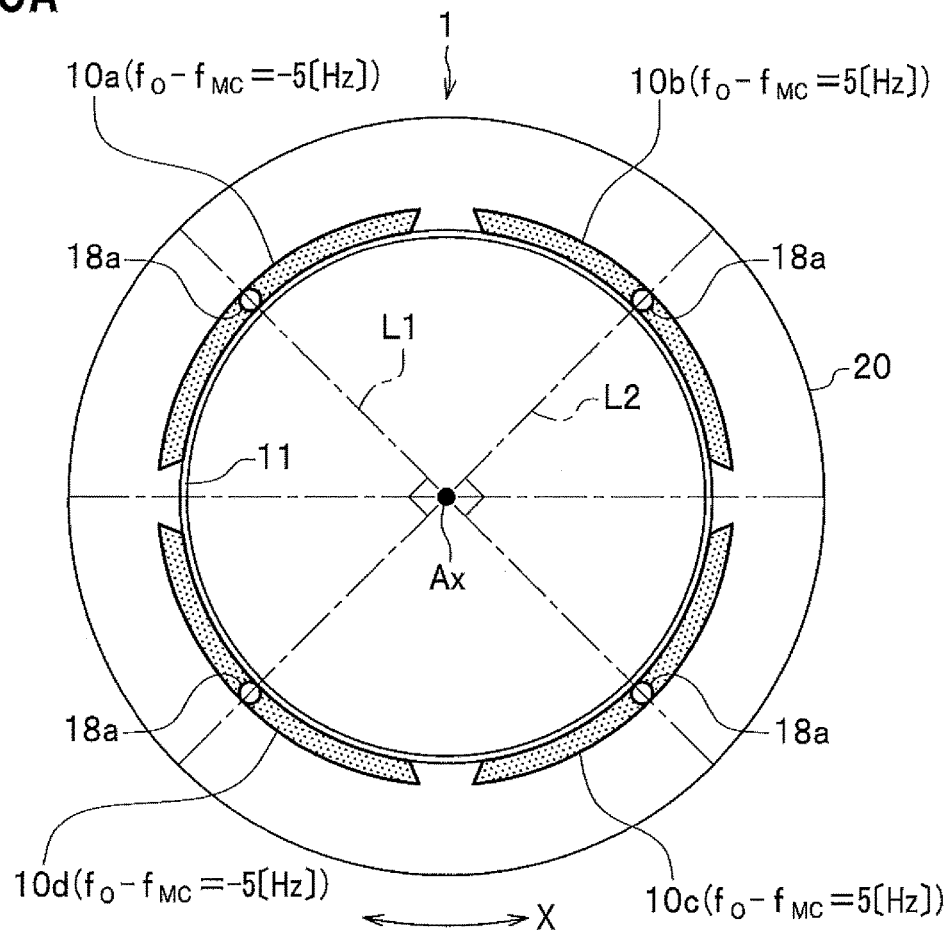
FIG. 5A is a side cross-sectional view schematically showing locations of first Helmholtz resonators and second Helmholtz resonators in a vehicle wheel of a working example of the present invention.
Figure 5B:
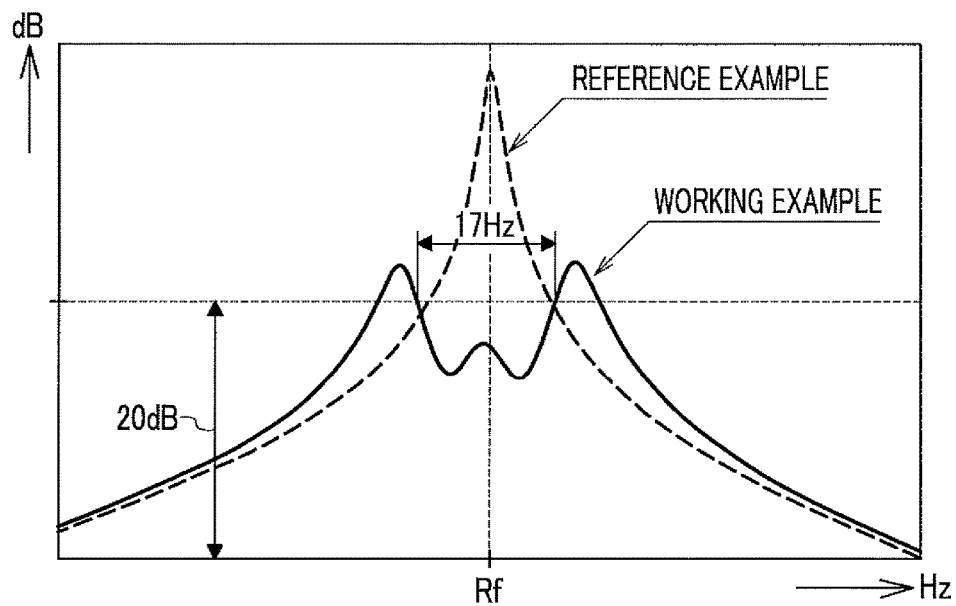
FIG. 5B is a graph showing sound deadening performance in the vehicle wheel in FIG. 5A.

FIG. 5A is a side cross-sectional view schematically showing locations of the auxiliary air chamber members 10a, 10d (first Helmholtz resonators) and the auxiliary air chamber members 10b, 10c (second Helmholtz resonators) in the vehicle wheel 1 of the working example. FIG. 5B is a graph showing sound deadening performance in the vehicle wheel 1 in FIG. 5A.

As shown in FIG. 5A, the resonance frequency $f_0$ of the auxiliary air chamber members 10a, 10d (first Helmholtz resonators) in the working example is set to be lower by 5 [Hz] than the resonance frequency $f_{MC}$ of the air column resonance sound in the tire air chamber MC. In FIG. 5A, this setting is described as $f_0 - f_{MC} = -5$ [Hz].

Also, the resonance frequency $f_0$ of the auxiliary air chamber members 10b, 10c (second Helmholtz resonators) in the working example is set to be higher by 5 [Hz] than the resonance frequency $f_{MC}$ of the air column resonance sound in the tire air chamber MC. In FIG. 5A, this setting is described as $f_0 - f_{MC} = 5$ [Hz].

The line L1 that connects the communication hole 18a for the auxiliary air chamber member 10a (first Helmholtz resonator) with the communication hole 18a for the auxiliary air chamber member 10c (second Helmholtz resonator), and the line L2 that connects the communication hole 18a for the auxiliary air chamber member 10d (first Helmholtz resonator) with the communication hole 18a for the auxiliary air chamber member 10b (second Helmholtz resonator), are perpendicular to each other.

In FIG. 5A, reference sign 20 denotes a tire tread.

Next, evaluation was made of sound deadening characteristics in the vehicle wheel 1.

A striking load by hammering was first applied to the tire tread 20 of the vehicle wheel 1 having the tire mounted thereon. Then, greatness of vibration acceleration of the wheel rotation center Ax was measured. FIG. 5B shows results of the evaluation.

The vertical axis in FIG. 5B represents the greatness [(m/s)/N] of the vibration acceleration per 1 [N] of excitation input at the time of the striking load being applied, converted into a unit of decibel [dB]. The horizontal axis in FIG. 5B represents the resonance frequency [Hz]. Note that Rf on the horizontal axis indicates a central value (resonance frequency $f_{MC}$) of the resonance frequency of the air column resonance sound in the tire.

As shown in FIG. 5B, in the case where a threshold of the vibration acceleration was set to a smaller value by an arbitrary value (e.g., 18 dB in this example) than a peak value of vibration acceleration in a vehicle wheel of a reference example not provided with the auxiliary air chamber member 10, the frequency range for sound deadening which centered on the central value Rf of the resonance frequency in the tire was 17 Hz.

Comparative Example 1

Figure 6A:
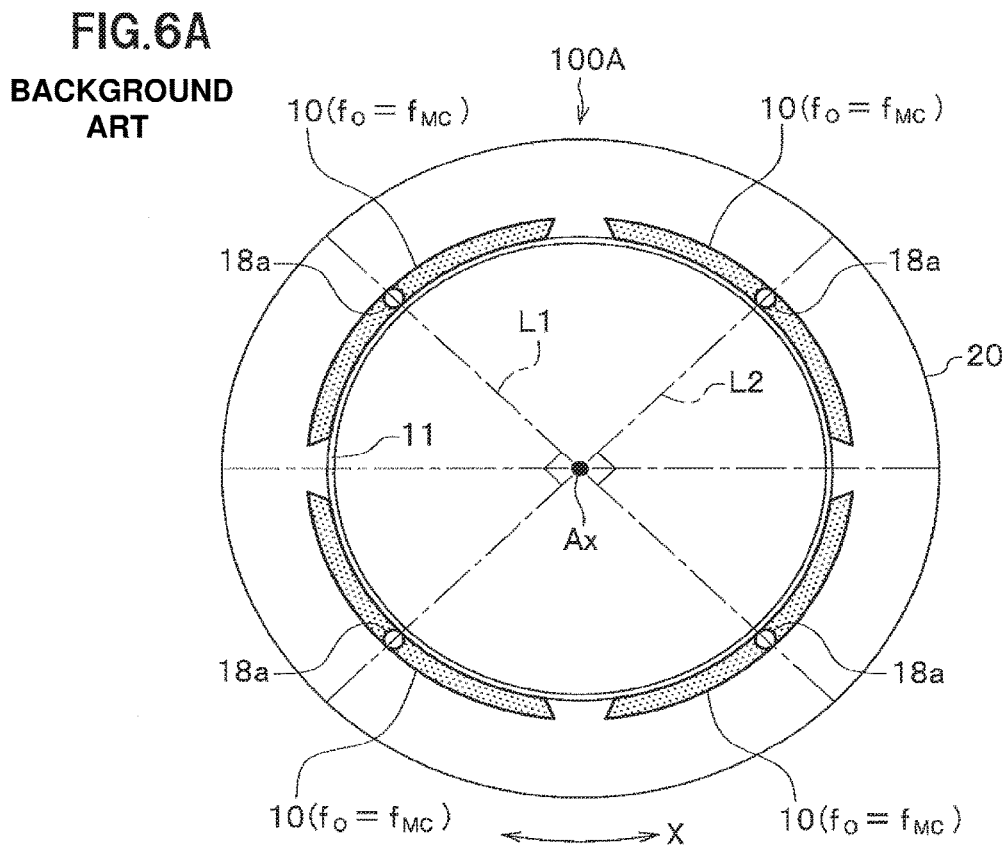
FIG. 6A is a side cross-sectional view schematically showing locations of Helmholtz resonators in a vehicle wheel of a comparative example 1 of the present invention.
Figure 6B:
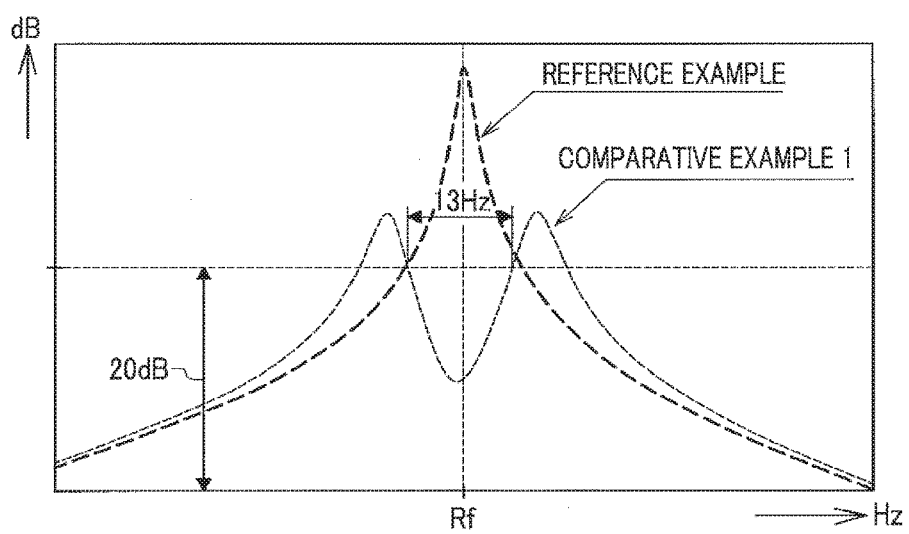
FIG. 6B is a graph showing sound deadening performance in the vehicle wheel in FIG. 6A.

FIG. 6A is a side cross-sectional view schematically showing locations of four auxiliary air chamber members 10 in a vehicle wheel 100A of the comparative example 1. FIG. 6B is a graph showing sound deadening performance in the vehicle wheel 100A in FIG. 6A.

As shown in FIG. 6A, the resonance frequency $f_0$ of the four auxiliary air chamber members 10 in the comparative example 1 is set to be the same as the resonance frequency $f_{MC}$ of the air column resonance sound in the tire air chamber MC.

The line L1 that connects the communication holes 18a for the auxiliary air chamber members 10 facing each other across the wheel rotation center Ax, and the line L2 that connects the communication holes 18a for the auxiliary air chamber members 10 facing each other across the wheel rotation center Ax, are perpendicular to each other.

In FIG. 6A, reference sign 20 denotes a tire tread.

Next, evaluation was made of sound deadening characteristics in the vehicle wheel 100A, in the same way as in the working example.

As shown in FIG. 6B showing results of the evaluation, in the case where the threshold of the vibration acceleration was set to a smaller value by an arbitrary value (e.g., 18 dB in this example) than the peak value of the vibration acceleration in the vehicle wheel of the reference example not provided with the auxiliary air chamber member 10, the frequency range for sound deadening which centered on the central value Rf of the resonance frequency in the tire was 13 Hz.

Comparative Example 2

Figure 7A:
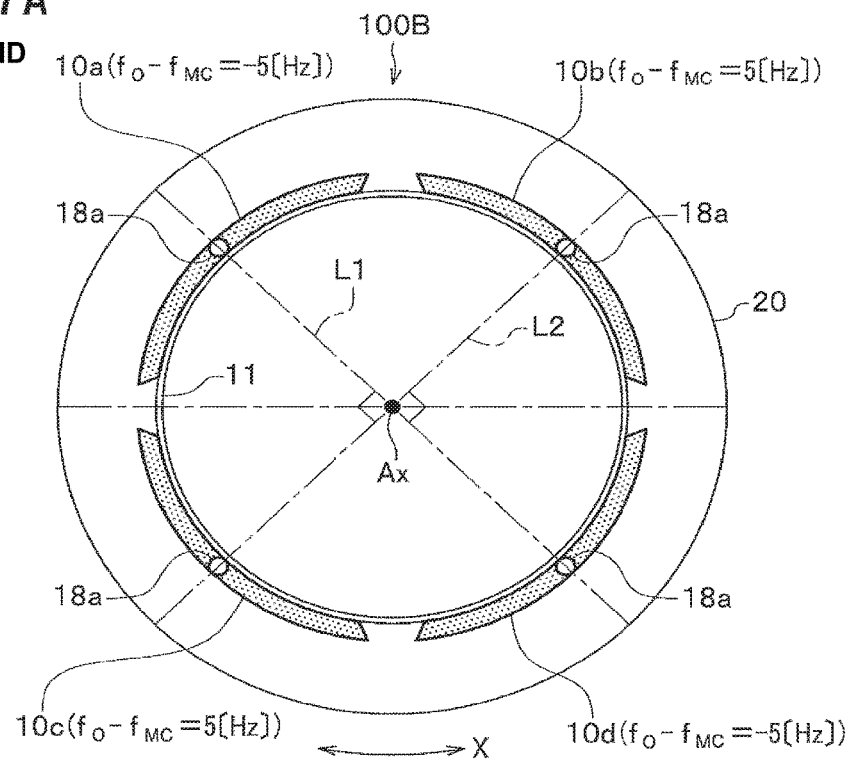
FIG. 7A is a side cross-sectional view schematically showing locations of Helmholtz resonators in a vehicle wheel of a comparative example 2 of the present invention.
Figure 7B:
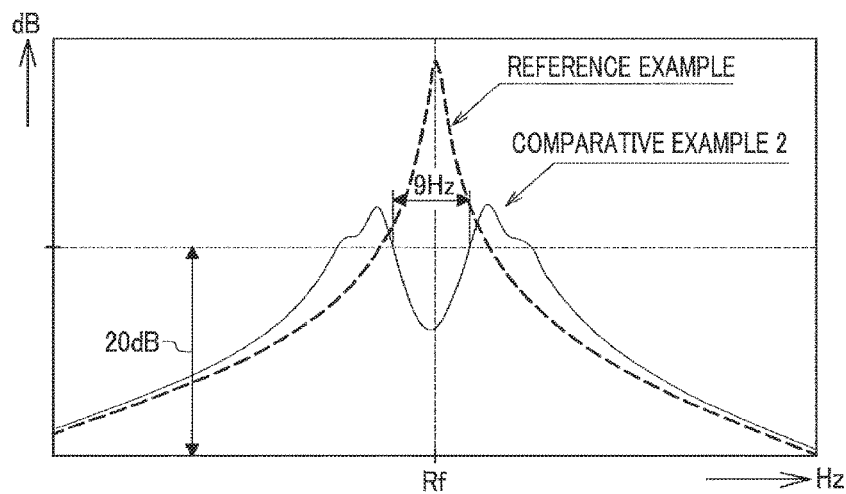
FIG. 7B is a graph showing sound deadening performance in the vehicle wheel in FIG. 7A.

FIG. 7A is a side cross-sectional view schematically showing locations of the auxiliary air chamber members 10a, 10d (first Helmholtz resonators) and the auxiliary air chamber members 10b, 10c (second Helmholtz resonators) in a vehicle wheel 100B of the comparative example 2. FIG. 7B is a graph showing sound deadening performance in the vehicle wheel 100B in FIG. 7A.

As shown in FIG. 7A, the comparative example 2 allows the auxiliary air chamber members 10a, 10d (first Helmholtz resonators) to face each other across the wheel rotation center Ax and the auxiliary air chamber members 10b, 10c (second Helmholtz resonators) to face each other across the wheel rotation center Ax. Moreover, the line L1 that connects the communication holes 18a for the auxiliary air chamber members 10a, 10d facing each other, and the line L2 that connects the communication holes 18a for the auxiliary air chamber members 10b, 10c facing each other, are perpendicular to each other.

Note that the resonance frequency $f_0$ of the auxiliary air chamber members 10a, 10d (first Helmholtz resonators) and the resonance frequency $f_0$ of the auxiliary air chamber members 10b, 10c (second Helmholtz resonators) are set to be the same as that of the auxiliary air chamber members 10a, 10b, 10c and 10d in the working example.

Next, evaluation was made of sound deadening characteristics in the vehicle wheel 100B, in the same way as in the working example.

As shown in FIG. 7B showing results of the evaluation, in the case where the threshold of the vibration acceleration was set to a smaller value by an arbitrary value (e.g., 18 dB in this example) than the peak value of the vibration acceleration in the vehicle wheel of the reference example not provided with the auxiliary air chamber member 10, the frequency range for sound deadening which centered on the central value Rf of the resonance frequency in the tire was 9 Hz.

(Results of Evaluation of the Vehicle Wheels of the Working Example and Comparative Examples 1, 2)

Figure 8:
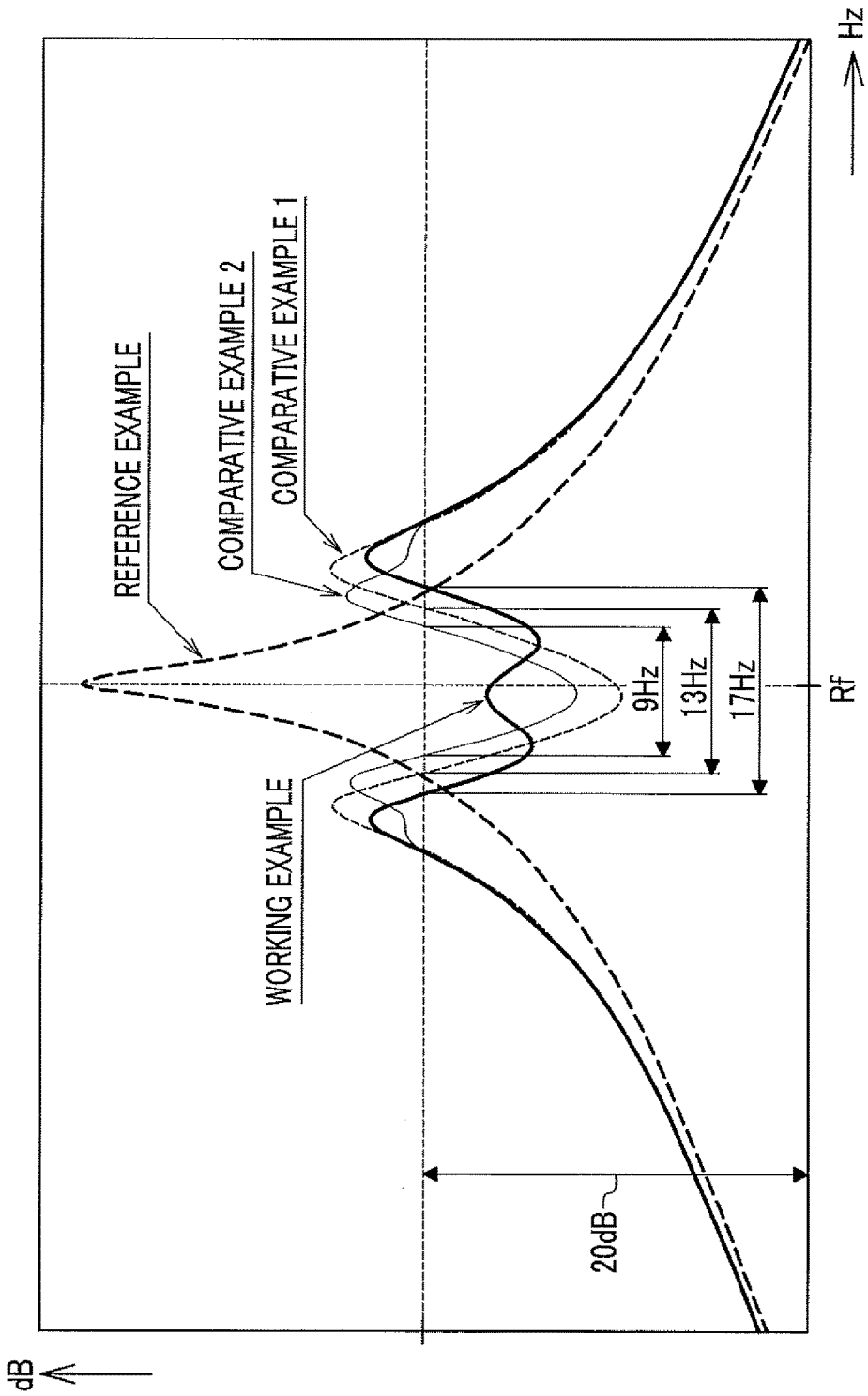
FIG. 8 is a graph collectively showing the graph diagrams in FIG. 5B, FIG. 6B and FIG. 7B.

FIG. 8 is a graph collectively showing the graph diagrams in FIG. 5B, FIG. 6B and FIG. 7B. Note that in FIG. 8, the reference example indicated by a thick dashed line represents distribution of the resonance frequency in the tire in the vehicle wheel not provided with the auxiliary air chamber member 10.

As shown in FIG. 8, in the vehicle wheel 1 of the working example in which the first Helmholtz resonator and the second Helmholtz resonator were allowed to face each other across the wheel rotation center Ax, the frequency range for sound deadening was widest, which was 17 Hz.

Moreover, in the vehicle wheel 100A of the comparative example 1 in which the resonance frequency $f_0$ was set to be the same as the resonance frequency $f_{MC}$ in the tire, the frequency range for sound deadening was narrower than the working example, which was 13 Hz.

Moreover, in the vehicle wheel 100B of the comparative example 2 in which although the first Helmholtz resonator and the second Helmholtz resonator were provided, the first Helmholtz resonator and the second Helmholtz resonator were not allowed to face each other across the wheel rotation center Ax, the frequency range for sound deadening was narrowest, which was 9 Hz.

From the above results, the vehicle wheel 1 of the working example has the widest frequency range for sound deadening, and thus provides good sound deadening performance for a tire having a wide frequency range of the air column resonance sound, as compared to the vehicle wheels 100A, 100B of the comparative examples 1, 2.

REFERENCE SIGNS LIST

1 Vehicle wheel
10 Auxiliary air chamber member
10a Auxiliary air chamber member (First Helmholtz resonator)
10b Auxiliary air chamber member (Second Helmholtz resonator)
10c Auxiliary air chamber member (Second Helmholtz resonator)
10d Auxiliary air chamber member (First Helmholtz resonator)
11 Rim
11c Well portion
11d Outer circumferential surface
13 Main body
14 Fringe portion
14a Fringe portion
14b Fringe portion
14c Fringe portion 14d Fringe portion
15 Vertical wall
16a First vertical wall surface
16b Second vertical wall surface
17a Groove
17b Groove
18a Communication hole
25a Upper plate
25b Lower plate
X Wheel circumferential direction
Y Wheel width direction
SC Auxiliary air chamber
MC Tire air chamber
Ax Wheel rotation center

The invention claimed is:

1. A vehicle wheel provided with Helmholtz resonators each having an auxiliary air chamber member communicated with a tire air chamber through a communication hole, the vehicle wheel comprising two groups of Helmholtz resonators, each group including:
  a first Helmholtz resonator that is set to have sound deadening characteristics for a sound having a lower resonance frequency than a resonance frequency of an air column resonance sound in the tire air chamber; and
  a second Helmholtz resonator that is set to have sound deadening characteristics for a sound having a higher resonance frequency than the resonance frequency of the air column resonance sound, wherein
  the communication holes for the first and the second Helmholtz resonators included in one group, and the communication holes for the first and second Helmholtz resonators included in another group, are disposed at positions facing each other across a wheel rotation center, respectively, and a line that connects the communication hole for the first Helmholtz resonator with the communication hole for the second Helmholtz resonator in the one group, and a line that connects the communication hole for the first Helmholtz resonator with the communication hole for the second Helmholtz resonator in the other group, are perpendicular to each other.

2. The vehicle wheel according to claim 1, wherein
when the resonance frequency of the air column resonance sound in the tire air chamber is expressed as $f_{MC}$, a resonance frequency of the first Helmholtz resonator is set to $f_{MC}-\alpha$ [Hz], where $\alpha$ is a positive number of 1 to 10, and a resonance frequency of the second Helmholtz resonator is set to $f_{MC}+\alpha$ [Hz].

* * * * *